(12) United States Patent
Shu et al.

(10) Patent No.: US 7,865,944 B1
(45) Date of Patent: Jan. 4, 2011

(54) INTERCEPTING GPRS DATA

(75) Inventors: Jesse C. Shu, Palo Alto, CA (US);
Chaohui Zhang, Foster City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1192 days.

(21) Appl. No.: 10/937,381

(22) Filed: Sep. 10, 2004

(51) Int. Cl.
*G06F 9/00* (2006.01)
(52) U.S. Cl. .......................... 726/11; 370/349
(58) Field of Classification Search .............. 726/11, 726/13; 713/153, 201; 370/349, 392
See application file for complete search history.

(56) References Cited

U.S. PATENT DOCUMENTS

| | | | |
|---|---|---|---|
| 5,857,191 A * | 1/1999 | Blackwell et al. ............... | 1/1 |
| 6,496,935 B1 * | 12/2002 | Fink et al. ....................... | 726/13 |
| 6,816,455 B2 * | 11/2004 | Goldberg et al. ............. | 370/230 |
| 6,853,648 B1 * | 2/2005 | Krstanovski et al. ......... | 370/465 |
| 6,854,063 B1 * | 2/2005 | Qu et al. ......................... | 726/13 |
| 7,346,922 B2 * | 3/2008 | Miliefsky ....................... | 726/3 |
| 2002/0078384 A1 * | 6/2002 | Hippelainen ................. | 713/201 |
| 2003/0081607 A1 * | 5/2003 | Kavanagh ..................... | 370/392 |
| 2003/0115328 A1 * | 6/2003 | Salminen et al. ............. | 709/225 |
| 2004/0013112 A1 * | 1/2004 | Goldberg et al. ............. | 370/389 |
| 2004/0120281 A1 * | 6/2004 | Gazzard ....................... | 370/328 |
| 2004/0264465 A1 * | 12/2004 | Dunk ............................ | 370/392 |

OTHER PUBLICATIONS

"Firewall-1 GX: Advanced Security for 2.5G and 3G Wireless Infrastructures", Check Point Software Technologies, Ltd. http://www.checkpoint.com/products/downloads/firewall-1_gx_datasheet.pdf, Printed on Sep. 2, 2004, pp. 1-4.

* cited by examiner

*Primary Examiner*—Kambiz Zand
*Assistant Examiner*—Amare Tabor
(74) *Attorney, Agent, or Firm*—Harrity & Harrity, LLP

(57) ABSTRACT

GPRS Tunneling Protocol ("GTP") packets are intercepted by receiving a GTP tunnel packet, determining whether the GTP tunnel packet is to be intercepted, intercepting GTP tunnel packets if it is determined that the GTP tunnel packet is to be intercepted, and processing the intercepted GTP tunnel packets. Multiple tunnels may be intercepted simultaneously and GTP tunnel packets from different tunnels may be processed differently. Implementations include both inline and offline interception of GTP traffic between SGSN and GGSN.

30 Claims, 7 Drawing Sheets

INTERCEPTING GPRS DATA

BACKGROUND OF THE INVENTION

A. Field of the Invention

Systems and methods consistent with principles of the invention relate generally to wireless communication, and more particular, to GPRS data transmitted wirelessly.

B. Description of Related Art

A General Packet Radio Service (GPRS) network provides mobile computing and telephony users with packet-switched connections to data networks. A subscriber with a mobile station may connect to other mobile stations or packet data networks to send and receive information. Conventionally, the information sent over the GPRS network is broken up into packets. A packet includes a header and a payload. The header may include instructions and information, such as error checking information, and source and destination addresses. The payload includes data that is to be delivered to the destination.

FIG. 1 illustrates a conventional GPRS network 100 used to connect one or more mobile stations 115a-115e ("mobile stations 115") to a packet data network, such as the Internet 173. One of mobile stations 115 may connect to a Serving GPRS Support Node (SGSN) 123, typically through a base station subsystem (not shown). A conventional base station subsystem is used to authenticate and track the mobile stations and manage connections. A public land mobile network (PLMN) may have multiple mobile stations and multiple SGSNs within its network. Packets may be transferred transparently between the mobile station and the Internet through GPRS network tunnels using a GPRS Tunneling Protocol ("GTP") (i.e., GTP tunnels). A GTP tunnel is dynamically created between supporting nodes (e.g., SGSN and GGSN (Gateway GPRS Support Node)) in the GPRS network. As shown in FIG. 1, one or more GTP tunnels 135 may be used to provide connection paths between a SGSN 123 and GGSN 152. Typically, one GTP tunnel 135 is created per GPRS user at any time. GTP tunnels 135 are typically identified by an associated GPRS user's IP address and each provides a given active GPRS user a path for communicating with zero to many hosts (i.e., servers) on the packet data network (e.g., Internet 173). Encapsulation adds additional address and control information to packets received at the entrance to a GTP tunnel, allowing the packets to be routed from the GTP tunnel start point to the GTP tunnel endpoint without intermediary systems having to inspect the data contained in the pre-encapsulated packet. The encapsulated packet may be decapsulated once the packet reaches the GTP tunnel endpoint system (e.g., GGSN 152). In a conventional GPRS system, packets received from a mobile station at an SGSN 123 are encapsulated and pass through GTP 135 tunnel to GGSN 152. Any number of routing/network components (not shown) may be interposed between the SGSNs and the GGSN.

A generic network firewall is a device that separates yet bridges networks. Network firewalls filter network traffic, forwarding legitimate traffic while otherwise processing suspect traffic (e.g., dropping suspect traffic). A GTP firewall is a generic network firewall that supports the GTP protocol. In the GPRS network, one or more GTP firewalls may be provided at the Gn or Gp interface in the network. For example in FIG. 1, between SGSN 123 and GGSN 152 is a Gn interface. A GTP firewall 141 at the Gn interface may be used to filter GTP packets that are sent to, and received by, SGSN 123. GTP firewall 141 may be used to ensure that the base station subsystems and other system components beyond the SGSN are not vulnerable in the event of compromise of GGSN 152. GTP firewall 141 may inspect packets sent through the interface and apply policies to support the security of SGSN 123. GTP firewall 141 may be configured to inspect tunnel traffic. Further, because of its position between the SGSN and GGSN, GTP firewall 141 has visibility to the creation and tear down of GTP tunnels.

GGSN 152 sends packets to and receives packets from the packet data network through an interface (Gi), on which a Gi firewall 161 may be supported. Gi firewall 161 may filter packets sent to/from Internet 173 before allowing the packets to continue on to GGSN 152. Gi firewall 161 therefore may provide some protection for GGSN 152 against unsolicited traffic and attacks.

As noted above, mobile stations 115 may access information from Internet 173 in addition to contacting other mobile stations. To receive packets from an Internet site, each of mobile station 115 typically needs an IP address to inform the sender where to route the packets. Not all mobile stations within a PLMN access Internet 173 at one time, allowing for each PLMN to use a small pool of IP addresses, often fewer IP addresses than mobile stations in the network. Individual mobile stations may be dynamically assigned PLMN IP addresses as necessary to support requested communications. After communications are complete, the assigned IP addresses may be reused by other subscribers (e.g., other mobile stations). When a subscriber wishes to access Internet 173, the subscriber uses one of mobile stations 115 to contact SGSN 123 and is assigned one of the IP addresses from the pool. The assigned IP address is identified with the particular mobile station and used in the pre-encapsulated packet header for all packets associated with the given user. A GTP tunnel is created from an associated SGSN 123 to GGSN 152 to allow the communication of packets from the mobile station to the external network. Encapsulation of packets occurs and data may pass from/to the mobile stations to/from the external network (e.g., Internet 173). Once a mobile station ends its connection, a GTP tunnel disconnect event occurs. The IP address associated with the mobile station may be returned to the IP address pool where the address may be reassigned to another of mobile stations 115.

In conventional GPRS networks, GGSN 152 may track the GPRS usage or Internet 173 access for each of mobile stations 115. Typically the GPRS usage is tracked according to incoming and outgoing packet traffic rather than time spent on the network. The incoming and outgoing packets may be assigned to the IP address in the packet header that corresponds to one of mobile stations 115 using the IP address at the time of transmission.

In addition to tracking GPRS usage, some government agencies may require the ability to track the content of GPRS network data. Lawful interception of GPRS data may be used by government agencies to facilitate, for example, crime prevention activities.

SUMMARY OF THE INVENTION

In accordance with one implementation consistent with the principles of the invention, a method is provided for intercepting packets in a packet switched communication network, the packet switched communication network including a portion operating in accordance with the GPRS tunneling protocol (GTP). The method includes receiving a GTP tunnel packet, determining whether the GTP tunnel packet is to be intercepted, intercepting GTP tunnel packets if it is determined that the GTP tunnel packet is to be intercepted, and processing the intercepted GTP tunnel packets.

In another implementation consistent with the principles of the invention, a GTP module is provided. The GTP module includes a tunnel request engine operable to process GTP tunnel requests. The GTP module also includes a tunnel packet engine operable to process GTP tunnel packets. One or more of the tunnel request engine and the tunnel packet engine are operable to determine whether to intercept GTP tunnel packets.

In yet another implementation consistent with the principles of the invention, a system is provided for intercepting GTP traffic. The system includes a GGSN and a SGSN. The system also includes a firewall coupled between the GGSN and the SGSN. The system also includes a GTP module, positioned to selectively intercept and process GTP traffic between the GGSN and the SGSN.

BRIEF DESCRIPTION OF DRAWINGS

The accompanying drawings, which are incorporated in and constitute a part of this specification, illustrate an implementation of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

System Overview

Figure 2:
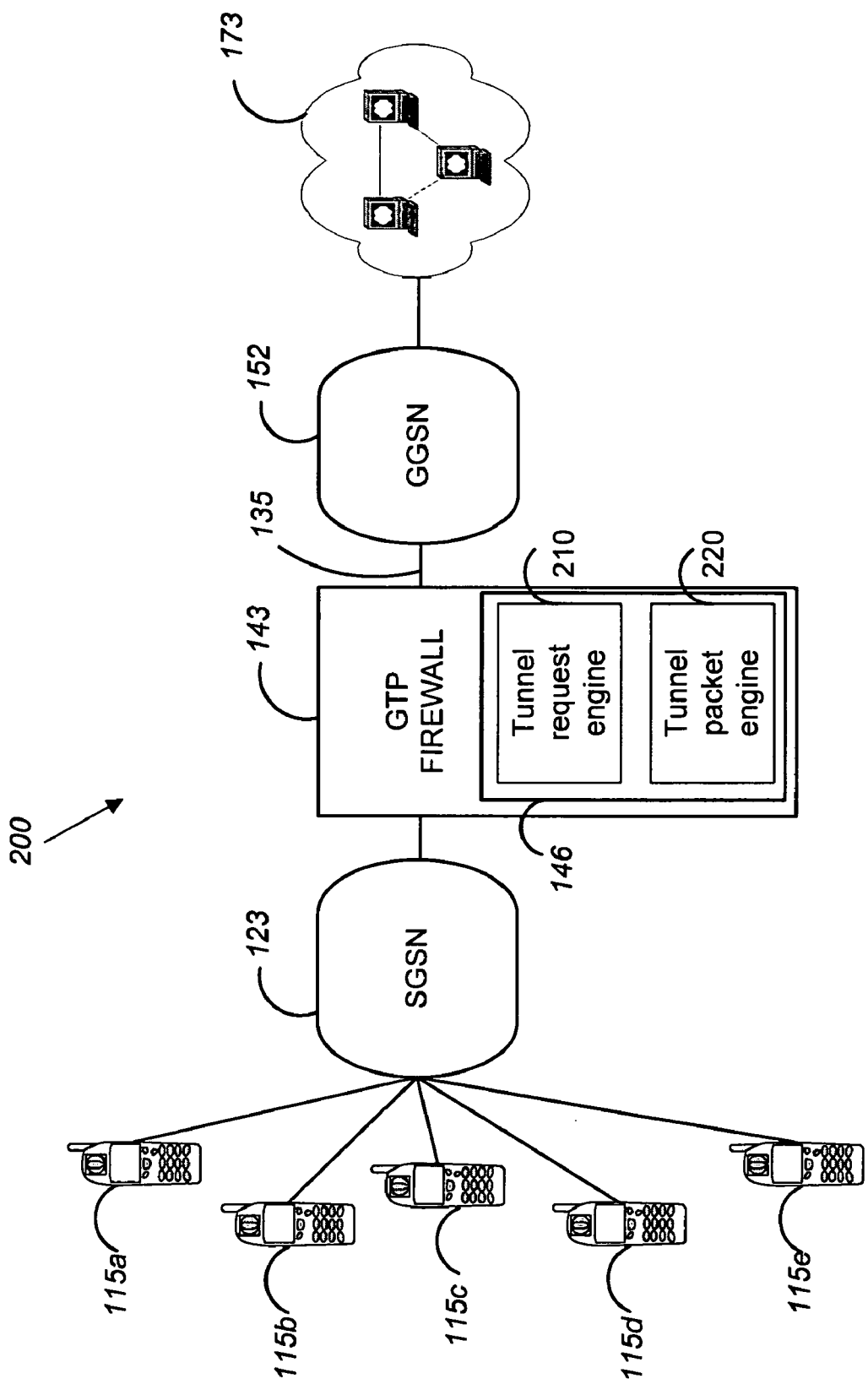
FIG. 2 is a block diagram illustrating one implementation of a packet switched communication system that provides GTP interception.

FIG. 2 is a block diagram illustrating an exemplary GPRS network 200 in which systems and methods consistent with the principles of the invention may be implemented. GPRS network 200 may include a plurality of mobile stations 115, a SGSN 123, a GTP firewall 143 including a GTP module 146, a tunnel request engine 210 and a tunnel packet engine 220, a GTP tunnel 135, a GGSN 152 and a packet data network 173 (e.g., the Internet, intranet, LAN, WAN, etc.).

Figure 1:
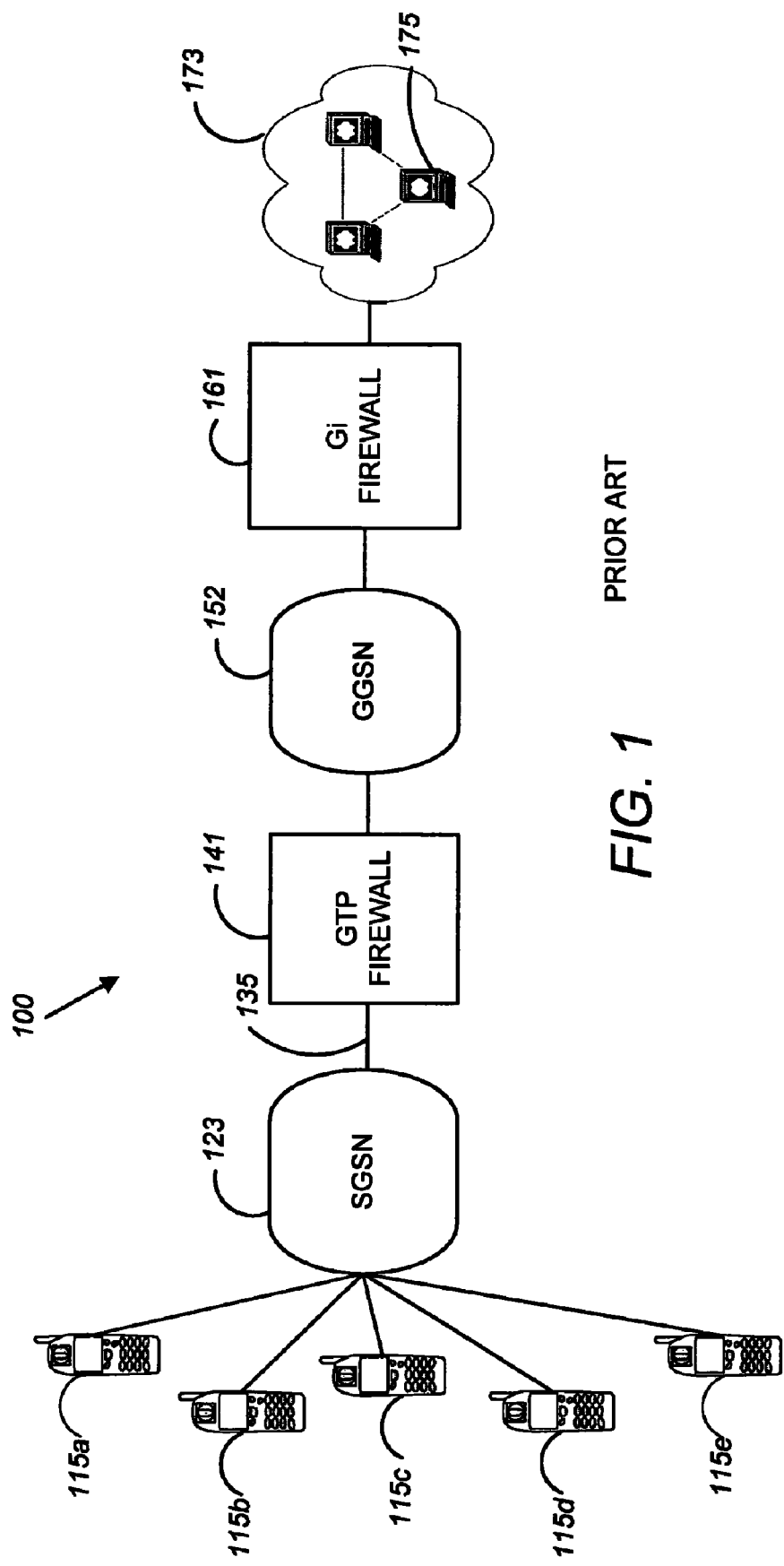
FIG. 1 is a block diagram illustrating a conventional system for packet switched communications between a mobile station and a land-based system.

In operation, GTP firewall 143 is configured to provide lawful interception of GTP traffic between an SGSN 123 and a GGSN 152. GPRS network 200 is similar to a conventional GPRS network 100 as shown in FIG. 1, but includes additional functionality for facilitating lawful interception of GTP communications. In one implementation consistent with principles of the invention, GTP firewall 143 may include a GTP module 146 for examining GTP traffic and provides lawful interception of GTP traffic between the SGSN 123 and GGSN 152. GTP firewall 143 may also perform additional firewall functions such as packet screening and access control. A Gi firewall (not shown) may be present between the Gi interface of GGSN 152 and packet data network 173. In one implementation, GTP traffic passing through GTP firewall 143 also passes through GTP module 146.

In addition, GTP module 146 may include tunnel request engine 210 and tunnel packet engine 220. In one implementation, tunnel request engine 210 processes GTP tunnel requests. The processing of GTP tunnel requests by tunnel request engine 210 may determine whether or not the GTP tunnel resulting from the request is to have packet data intercepted. In one implementation, tunnel request engine 210 may include a list of interception IDs that are used to identify mobile users for interception.

In one implementation consistent with principles of the invention, tunnel packet engine 220 may process GTP tunnel packets passing through GTP module 146. Similar to tunnel request engine 210, tunnel packet engine 220 may include a list of tunnel IDs identifying specific tunnels for interception. For example, tunnel packet engine 220 may intercept traffic from GTP tunnels based on the processing of GTP tunnel requests by tunnel request engine 210. Alternatively, tunnel packet engine 220 may process GTP tunnel packets for a particular tunnel based on a list of interception IDs. Tunnel packet engine 220 may then determine whether or not to intercept data from the GTP tunnel.

Exemplary Processing

Generally speaking, when one of mobile stations 115 attaches to packet data network 173, a GTP tunnel 135 is established between SGSN 123 and GGSN 152. Initially, a tunnel request is transmitted from SGSN 123 to GGSN 152 to initiate GTP tunnel 135. A positive response received back from the GGSN 152 completes GTP tunnel 135. After the establishment of GTP tunnel 135, data packets may be exchanged between SGSN 123 and GGSN 152 through the tunnel. In one implementation, packets that are transmitted through GTP tunnel 135 are encapsulated to ensure proper routing to an end of GTP tunnel 135. Within the encapsulated packet is source and destination information that does not designate the endpoints of GTP tunnel 135, but rather the mobile station's IP address and the IP address of the Internet server, thus allowing the packet to be routed outside of GTP tunnel 135. Multiple GTP tunnels between SGSN 123 and GGSN 152 may exist simultaneously allowing multiple mobile stations 115 to connect to packet data network 173. GTP transmissions, including the tunnel request and response, pass through GTP firewall 143 located between SGSN 123 and GGSN 152.

Figure 3:
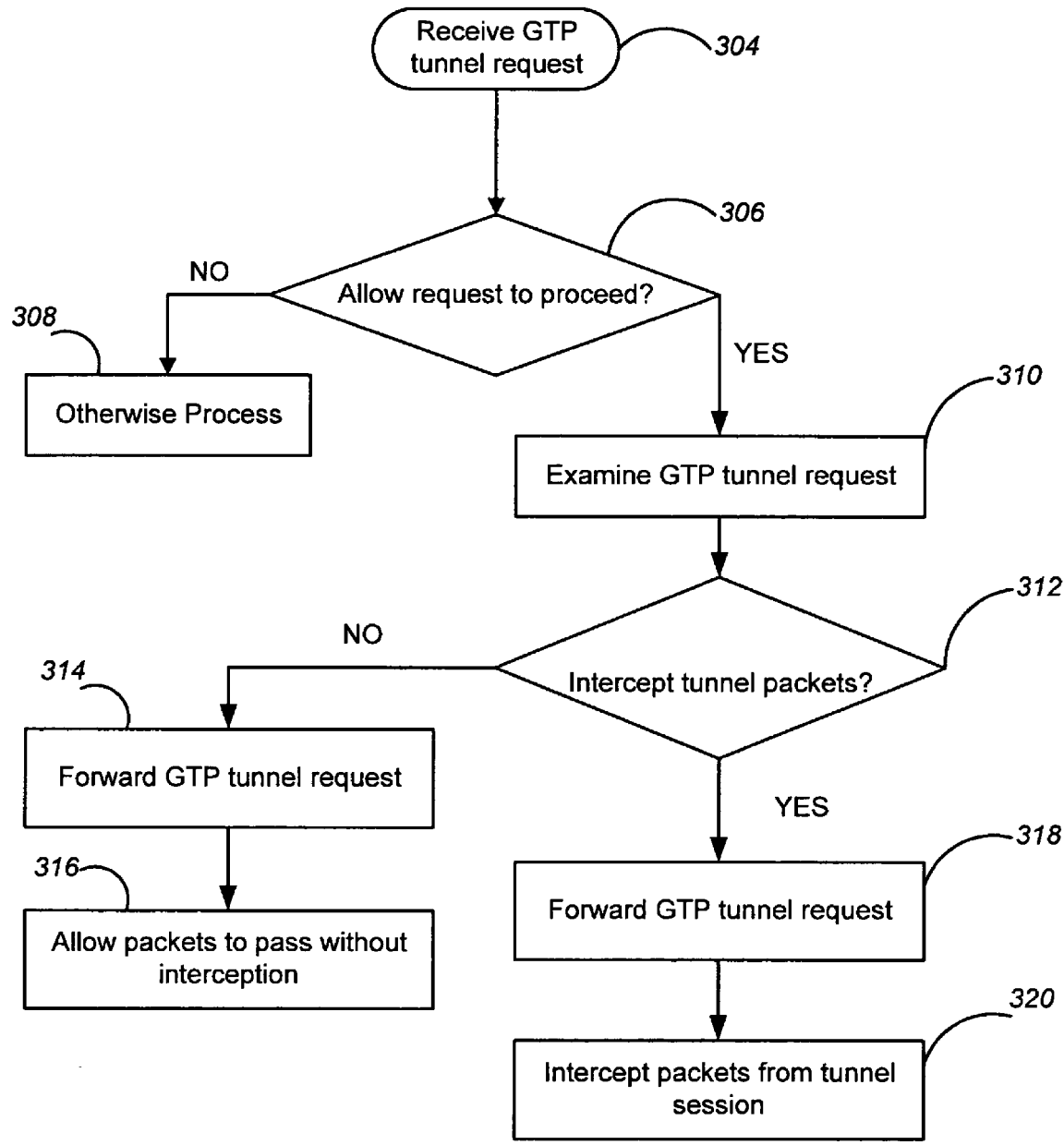
FIG. 3 is a flow chart illustrating one implementation of a method for intercepting GTP traffic consistent with principles of the invention.

FIG. 3 is a flow diagram illustrating one method for intercepting GTP traffic through GTP firewall 143 consistent with principles of the invention. Initially, GTP firewall 143 receives a GTP tunnel request (act 304). The GTP firewall examines the GTP tunnel request (act 305) based on an access control policy. In one implementation, the access control policy may enable GTP traffic to pass through while blocking non-GTP traffic. The access control policy may also be designed, for example, to prevent communications to SGSN 123 from untrusted GGSNs by blocking traffic from some GGSNs while allowing GTP traffic from other GGSNs. The access control policy may also be designed to prevent GTP traffic originating from individual IP addresses. In an alternative implementation, the access control policy may be configured to allow GTP traffic from some SGSN's or individual mobile subscribers while denying GTP traffic from other mobile subscribers.

GTP firewall 143 next determines whether or not to allow the GTP tunnel request to proceed (act 306). If, based on the applied access control policy, the GTP tunnel request is not allowed to proceed, the request may be otherwise processed (act 308). Such additional processing may include dropping, logging, alarming, or any other suitable processing. If the GTP tunnel request is allowed to proceed, the GTP tunnel request proceeds through GTP module 146. In one implementation, all GTP traffic passing through GTP firewall 143 is routed through GTP module 146. The GTP tunnel request is then examined by GTP module 146 (act 310). In one implementation, tunnel request engine 210 examines the information contained within the GTP tunnel request for user identifiers that match a list of interception IDs. In one implementation, the list of interception IDs are included within tunnel request engine 210. Interception IDs may trigger an interception process applied to corresponding tunnel traffic as described below with respect to FIG. 4.

The GTP tunnel request and response messages used to create a GTP tunnel may include a number of user identifiers. In one implementation, the user identifiers may include user-specific data that may uniquely identify a specific mobile station 115. More particularly, the user identifiers present may include, an International Mobile Subscriber Identity (IMSI) number allocated to each Global System for Mobile Communications (GSM) subscriber, a Mobile Station Integrated Services Digital Network (MSISDN) number assigned to each mobile subscriber, an IP address allocated for each mobile station activated in the GPRS network, a GTP tunnel endpoint identifier allocated by a GPRS support node to identify a tunnel, a Routing Area Identity number used to identify a network routing area within a GSM location area, an Access Point Name that identifies an external packet data network (e.g., yahoo.com), a Charging ID number to identify a GTP tunnel for billing, and a Charging Gateway Address which is an IP address allocated for each charging gateway to collect billing information.

Tunnel request engine 210 examines the GTP tunnel request for user identifiers that match an entry on a list of interception IDs. For example, a mobile operator administering the GTP firewall 143, or specifically GTP module 146, may configure a list of interception IDs that may then be loaded into tunnel request engine 210 or some other memory storage area accessible by tunnel request engine 210. In one embodiment consistent with principles of the invention, the list of interception IDs may be updated or modified by mobile operators in real-time, either locally or remotely. Tunnel request engine 210 may compares the list of interception IDs with the user identifiers contained in the GTP tunnel request in order to determine if the packets associated with the GTP tunnel created based on the GTP tunnel request should be intercepted by GTP module 146.

The list of interception IDs may include entries having varied specificity, essentially creating flexible triggers for interception that may be broad or narrow. For example, in one implementation, a list entry may include an interception ID that corresponds to an IMSI number. As stated above, an IMSI number uniquely identifies a particular one of mobile stations 115. More specifically, an IMSI number is a 15-digit number that includes a Mobile Country Code, a Mobile Network Code, and a Mobile Subscriber Identification Number. Whenever the mobile station having an IMSI number matching the list entry accesses the GTP network, by initiating a GTP tunnel request, the tunnel traffic may be intercepted. In another example, however, a list entry includes an interception ID that corresponds to an IMSI number as well as an Access Point Name. Data packets passing through a GTP tunnel initiated by a mobile station having the listed IMSI number are only intercepted when communicating with a particular Access Point Name such as "yahoo.com." Thus, in this implementation, not all GTP traffic from a specific mobile station is intercepted (i.e., only the traffic from a specific mobile subscriber accessing a specific destination is intercepted). Finally, in one further example of increased list specificity, the list entry may include an interception ID that corresponds to an IMSI number, Access Point Name, and a MSISDN number. In this example, interception of tunnel traffic for a mobile station is only triggered when the tunnel request matches all three parts of the interception ID entry. Consequently, some of mobile stations 115 will have all traffic intercepted while others will only have some traffic intercepted depending on the content of the interception ID corresponding to each mobile station.

Returning to FIG. 3, after examining the GTP tunnel request, GTP module 146 determines whether to intercept tunnel packets transported through the GTP tunnel created according to the GTP tunnel request (act 312). If the user identifiers included with the GTP tunnel request do not match an entry on the list of interception IDs, the GTP tunnel request is forwarded to the destination GGSN 152 (act 314). Furthermore, packets transmitted through the GTP tunnel formed as a result of the GTP tunnel request may be allowed to pass without interception (act 316). However, if the user identifiers included with the GTP tunnel request correspond to an entry on the list of interception IDs, then the GTP tunnel request is again forwarded to the destination GGSN 152 (act 318), but the data packets from the resulting GTP tunnel are intercepted by GTP module 146 (act 320).

Figure 4:
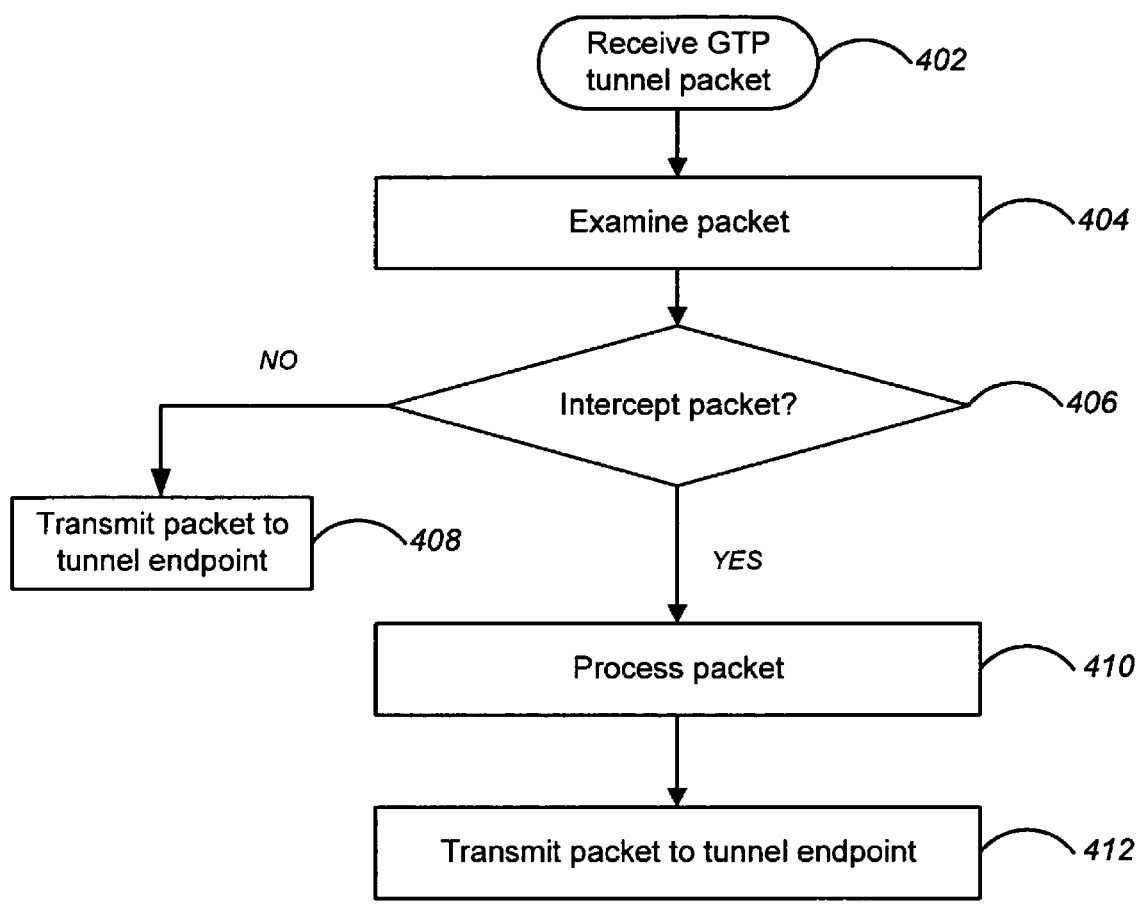
FIG. 4 is a flow chart illustrating another implementation of a method for intercepting GTP traffic consistent with principles of the invention.

FIG. 4 is a flow diagram illustrating another flow diagram illustrating a method for intercepting GTP tunnel packets in accordance with another implementation consistent with principles of the invention. After the establishment of a GTP tunnel, such as GTP tunnel 135, packets may be transmitted through the GTP tunnel between SGSN 123 and GGSN 152. Packets are encapsulated at an endpoint of the GTP tunnel into a GTP tunnel packet. The GTP tunnel packet includes a GTP header and an encapsulated payload. The GTP tunnel passes through GTP firewall 143, which is positioned between SGSN 123 and GGSN 152. If the GTP packets are allowed to pass, based on the access control policy of GTP firewall 143, the GTP packets are routed through GTP module 146. Multiple GTP tunnels may pass through GTP firewall 143 at one time such that packets from multiple GTP tunnels pass through GTP module 146.

Initially, GTP module 146 receives a tunnel packet (act 402). Once received, GTP module 146 examines the packet (act 404). In one implementation, tunnel packet engine 220 examines the GTP tunnel packets. The GTP header of the tunnel packet may uniquely identify the GTP tunnel to which the packet belongs. The GTP header of the tunnel packet may also include other user identifying information such as a mobile subscriber ID number (IMSI or MSISDN). Tunnel packet engine 220 may then determine whether or not to intercept the tunnel packet based on the tunnel packet examination (act 406). For example, if an interception process was triggered by examination of the GTP tunnel request, then tunnel packet engine 220 may identify corresponding tunnel packets based on the tunnel ID information contained within the GTP header of the tunnel packet. Thus, by identifying traffic to be intercepted when a GTP tunnel is being formed (e.g., by examining a GTP tunnel request), tunnel packet engine 220 may readily identify GTP packets passing through the resulting GTP tunnel. For example, a list of tunnel IDs corresponding to tunnels identified for interception may be generated by the GTP module 146 in order to facilitate GTP packet interception. In one implementation, the list of tunnel IDs may be included in tunnel packet engine 220.

In an alternative implementation consistent with principles of the invention, tunnel packet engine 220 may examine the unique mobile subscriber IDs contained within the tunnel ID to see if the user identifiers match an entry on the list of interception IDs. For example, when the list of interception IDs have been updated to include a new entry, after the tunnel to be intercepted has been created, it may be necessary to examine the individual GTP packets in order to determine whether or not to intercept the GTP packet. If a match is found, subsequent GTP packets from the same tunnel may be identified based on the tunnel ID associated with the GTP packets without returning to the list of interception IDs to search for a match. The list of interception IDs may be included in tunnel packet engine 220 in addition to tunnel request engine 210. Alternatively, tunnel packet engine 220 may access the list of interception IDs, for example, through communication with another device, such as tunnel request engine 210.

Returning to FIG. 4, if the GTP tunnel packet does not match an interception ID, the packet is not intercepted and is allowed to pass to the tunnel endpoint without interference (act 408). If the GTP tunnel packet does match an interception ID, the packet is then processed (act 410) before being allowed to proceed to the endpoint of the GTP tunnel (act 412). The list of interception IDs may include processing instructions for different interception IDs. The default setting may be to perform no processing to packets, which may then be modified to tailor processing for each particular interception ID entry.

For example, a packet may be recorded such that tunnel packet engine 220 creates a complete copy of all GTP signaling and data packets passing through an intercepted GTP tunnel. In one implementation, the GTP signaling and data packets may be recorded in a memory in tunnel packet engine 220. More specifically, the packets may be recorded in encapsulated form or the packets may be de-encapsulated prior to recording. Additionally, the packets may be logged such that tunnel packet engine 220 tracks the number of packets being transmitted as well as start and stop times of the tunnel transmission. In another implementation, the GTP module (e.g., GTP module 146) includes a memory for recording and logging interception packets. Additionally, treatment of subsequent tunnel packets may be established. For example, instead of recording every packet traveling through an intercepted tunnel, a set number of packets may initially be recorded. Subsequent packets may then be allowed to pass without interference. For example, a specific amount of data, or a specific length of time, may be used to establish a recording endpoint. In a further implementation, the recorded packets may be transmitted to an external location for storage or analysis.

Because multiple tunnels may pass though GTP firewall 143 at one time, it should be understood that a number of tunnel interceptions may take place simultaneously. Additionally, each interception ID may designate different processing requirements. For example, one interception ID may require that corresponding tunnel packets be logged while another interception ID may require that corresponding tunnel packets be transmitted to an external location for analysis.

It should be further understood that the logged or recorded packet information may be viewed and analyzed using various techniques. For example, in one implementation, the packets may be logged in the firewall log as a category within a system log and subsequently accessible by the firewall log manager. In another implementation, a firewall administrator or mobile operator may use an external interface, such as a network browser to view and analyze the log entries. The logged or recorded packets may also be transmitted to an external agency, such as a government agency for analysis and review.

Figure 5:
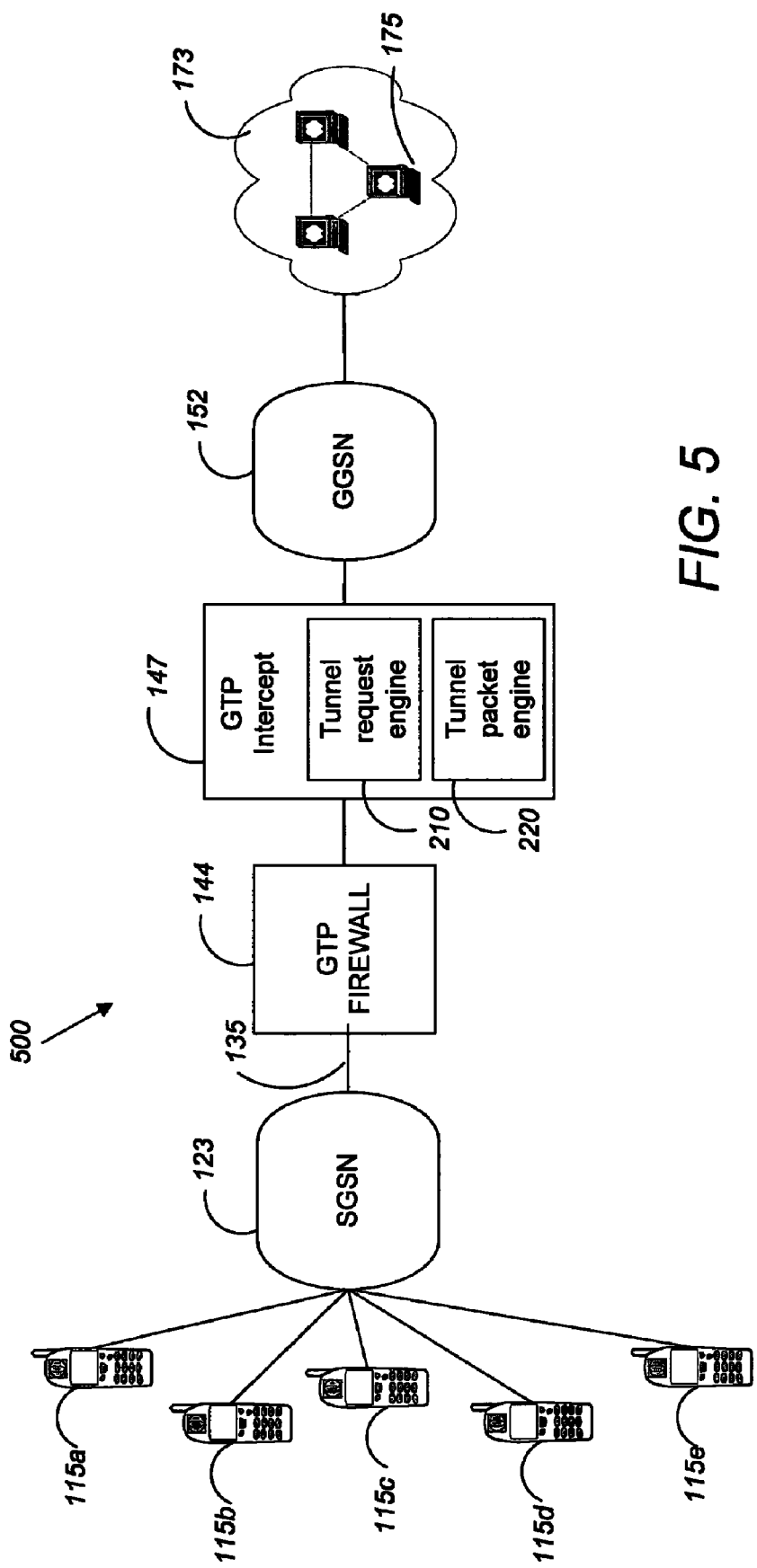
FIG. 5 is a block diagram illustrating an alternative packet switched communication system for providing GTP interception.

FIG. 5 is another block diagram illustrating a GPRS network 500 including a GTP intercept device 147 positioned inline between an SGSN 123 and a GGSN 152 and operable to provide lawful interception of GTP traffic between SGSN 123 and GGSN 152 independent from a GTP firewall 144, consistent with principles of the invention. GTP intercept device 147 may be positioned between SGSN 123 and GGSN 152 such that GTP traffic between SGSN 123 and GGSN 152 passes through inline GTP intercept device 147. It should be noted that while GTP firewall 144 is shown as being logically connected between SGSN 123 and GTP intercept device 147, GTP intercept device 147 may alternatively be logically connected between SGSN 123 and GTP firewall 144. Alternatively, in another implementation, GTP intercept device 147 may be logically connected between SGSN 123 and GGSN 152 in a GPRS network in which GTP firewall 144 is not present.

Figure 6:
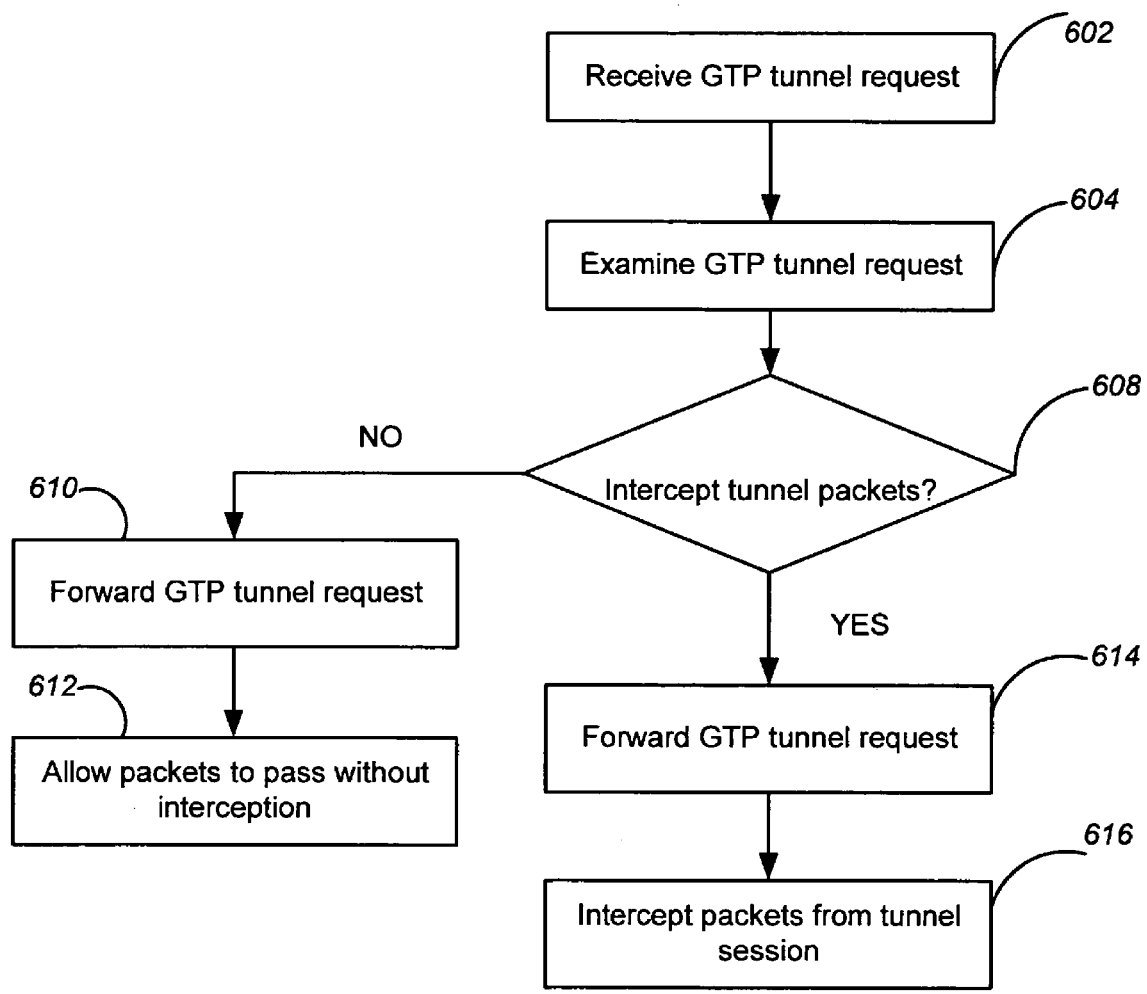
FIG. 6 is a flow chart illustrating yet another implementation of a method for intercepting GTP traffic consistent with principles of the invention.

FIG. 6 is a flow diagram illustrating a method for intercepting GTP tunnel packets in accordance with yet another implementation consistent with principles of the invention. One of mobile stations 115 wishing to connect to a network 173 contacts SGSN 123. SGSN 123 transmits a GTP tunnel request to GGSN 152 to establish a GTP tunnel for packet communication between SGSN 123 and GGSN 152. Because the GTP intercept device 147 is positioned between SGSN 123 and GGSN 152, GTP intercept device 147 initially receives the GTP tunnel request (act 602).

GTP intercept device 147 next examines the GTP tunnel request (act 604). The user identifiers associated with the GTP tunnel request are compared with a list of interception IDs to determine whether or not tunnel packets transported though a GTP tunnel created according to the GTP tunnel request should be intercepted (act 608). If the user identifiers associated with the GTP tunnel request do not match an entry in the list of interception IDs the GTP tunnel request is forwarded on to GGSN 152 (act 610) and tunnel packets transported through the GTP tunnel formed as a result of the GTP tunnel request may be allowed to pass without interception (act 612). If the user identifiers associated with the GTP tunnel request match an entry in the list of interception IDs, the GTP tunnel request is again forwarded to GGSN 152 (act 614), however the data packets from the resulting GTP tunnel are intercepted by GTP intercept device 147 (act 616). The examination of the GTP tunnel request, as well as GTP tunnel packets may be performed by GTP intercept device 147 in the same manner as described above with respect to GTP module 146.

Figure 7:
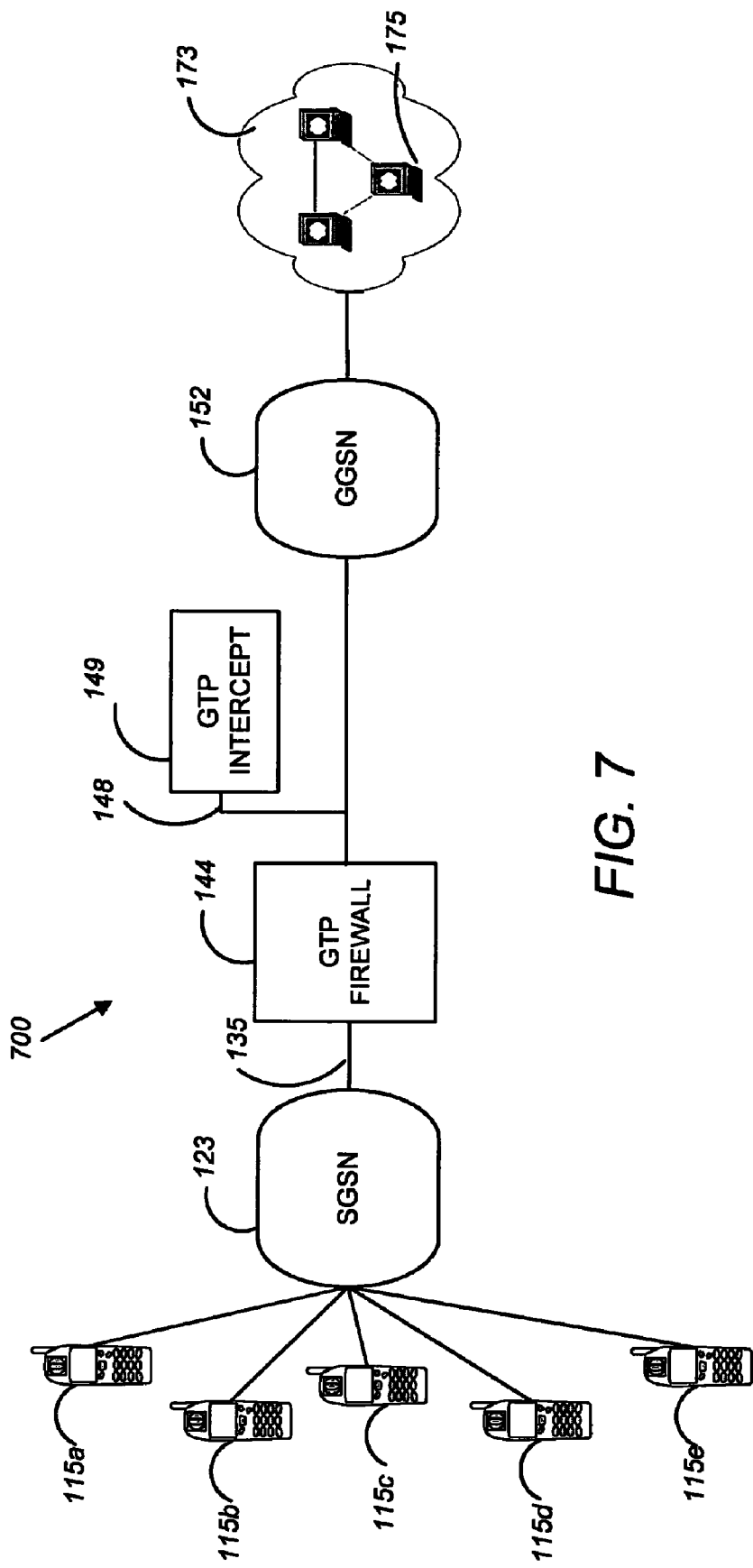
FIG. 7 is a block diagram illustrating an alternative packet switched communication system that provides offline GTP interception.

FIG. 7 is a block diagram illustrating a GPRS network 700 including a GTP intercept device 149 positioned offline in parallel between an SGSN 123 and a GGSN 152 and operable to provide lawful interception of GTP traffic between SGSN 123 and GGSN 152 independent from a GTP firewall 144. GTP intercept device 149 is positioned in parallel between SGSN 123 and GGSN 152 such that a copy of GTP traffic between SGSN 123 and GGSN 152 may be routed though GTP intercept device 149 for processing without interfering with the GTP traffic passing between SGSN 123 and GGSN 152. Thus, the GTP intercept device 149 may monitor all GTP traffic passing between SGSN 123 and GGSN 152 without being directly in the path of the GTP traffic. GTP firewall 144 is shown between SGSN 123 and GTP intercept device 149, however, GTP intercept device 149 may alternatively be positioned between SGSN 123 and GTP firewall 144. Alternatively, GTP intercept device 149 may be positioned between SGSN 123 and GGSN 152 in a network without a GTP firewall. GTP intercept device 149 may include a tunnel intercept engine and a tunnel packet engine as shown in GTP intercept device 147 of FIG. 5. Additionally, GTP intercept device 149 may include a tap 148 for coupling the GTP intercept device 149 to the GTP traffic between SGSN 123 and GGSN 152.

In operation, GTP intercept device 149 may function in a manner similar to GTP intercept device 147 described above with respect to FIGS. 5 and 6. GTP intercept device 149 may process GTP tunnel requests to identify mobile users to be intercepted based on a list of interception IDs. GTP packets passing though GTP tunnels may be processed and intercepted. However, because the GTP intercept device 149 only taps the GTP traffic, GTP packets determined not to be intercepted may be dropped. Intercepted content may be copied, logged, forwarded, or otherwise processed, as described above. Intercepted packets may be routed to an external destination for processing. In another implementation, GTP intercept 149 intercepts all GTP traffic and forwards the GTP traffic to an external location for processing and analysis.

CONCLUSION

Implementations consistent with the principles of the invention provide methods and systems for intercepting GPRS data. More particularly, in one implementation consistent with principles of the invention, a GPRS tunnel packet is received and examined. GTP tunnel packets identified for interception are then intercepted and processed. Additionally, although not specifically described above, it should be understood that GTP firewall 143 or the GTP intercept device 149 may be operated in a transparent mode (i.e., the firewalls may be run in different modes with awareness of routing and application or not).

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIGS. 3, 4, and 6 the order of the acts may be varied in other implementations consistent with the present invention. In addition, non-dependent acts may be implemented in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method performed by a firewall for intercepting GPRS tunneling protocol (GTP) packets, the method comprising:

receiving, at a tunnel request engine of the firewall, a GTP tunnel request from a first GTP tunnel endpoint;

identifying, by the tunnel request engine, a user identifier associated with the GTP tunnel request;

identifying, by the tunnel request engine, a GTP tunnel over which GTP tunnel packets, that are to be intercepted, will travel based on the user identifier and a list of interception identifiers;

adding, by the tunnel request engine, a tunnel identifier for the GTP tunnel to a list of GTP tunnel identifiers recognized for interception;

forwarding, by the tunnel request engine, the GTP tunnel request to a second GTP tunnel endpoint;

after the adding the tunnel identifier to the list of GTP tunnel identifiers, receiving, at a tunnel packet engine of the firewall that is different than the tunnel request engine, GTP tunnel packets associated with the GTP tunnel, each of the GTP tunnel packets including tunnel identification information;

determining, by the tunnel packet engine, whether each of the GTP tunnel packets is to be intercepted based on a comparison of the tunnel identification information to the list of GTP tunnel identifiers, where the determining comprises comparing a user identifier in a header of one of the GTP tunnel packets with the list of interception identifiers, when the list of interception identifiers has been updated to include a new entry after the GTP tunnel over which the GTP tunnel packets that are to be intercepted has been created;

intercepting, by the tunnel packet engine, each of the GTP tunnel packets when there is a match between the tunnel identification information and the list of GTP tunnel identifiers;

intercepting, by the tunnel packet engine, the one of the GTP tunnel packets when there is a match between the user identifiers in the header of the one of the GTP tunnel packet and the list of interception identifiers; and processing, by the tunnel packet engine, each of the intercepted GTP tunnel packets.

2. The method of claim 1, where receiving, at the tunnel request engine of the firewall, the GTP tunnel packets further comprises:

inline tapping GTP tunnel packets passing through a GPRS tunneling protocol portion of a packet switched communication network that receives the GTP tunnel packets.

3. The method of claim 1, where receiving, at the tunnel request engine of the firewall, the GTP tunnel packets further comprises:

offline tapping GTP tunnel packets passing through a GPRS tunneling protocol portion of a packet switched communication network that receives the GTP tunnel packets.

4. The method of claim 1, where determining, by the tunnel packet engine, whether each of the GTP tunnel packets is to be intercepted further comprises:

identifying a tunnel identifier associated with each of the GTP tunnel packets.

5. The method of claim 1, where the user identifiers include a mobile subscriber identification number.

6. The method of claim 1, further comprising:

intercepting, by the tunnel request engine, GTP tunnel packets from a plurality of GTP tunnels simultaneously.

7. The method of claim 6, further comprising:

processing, by the tunnel request engine, intercepted GTP data packets differently for each of the plurality of GTP tunnels.

8. The method of claim 1, where processing, by the tunnel packet engine, each of the intercepted GTP tunnel packets further comprises:
logging each of the GTP tunnel packets in a memory.

9. The method of claim 1, where processing, by the tunnel packet engine, each of the intercepted GTP tunnel packets further comprises:
recording each of the GTP tunnel packets in a memory.

10. The method of claim 1, where processing, by the tunnel request engine, each of the intercepted GTP tunnel packets further comprises:
transmitting each of the GTP tunnel packets to the second GTP tunnel endpoint.

11. The method of claim 1, where processing, by the tunnel request engine, each of the intercepted GTP tunnel packets further comprises:
executing instructions in the list of interception identifiers to determine a manner of processing of each of the intercepted GTP tunnel packets.

12. The method of claim 1, further comprising:
forwarding each of the GTP tunnel packets to a destination.

13. The method of claim 1, where the user identifier includes one or more of an International Mobile Subscriber Identity number, a Mobile Station Integrated Services Digital Network number, an Internet Protocol (IP) address, a GTP tunnel endpoint identifier, a Routing Area Identity number, an Access Point Name, a Charging ID number, or a Charging Gateway Address, and
where identifying the GTP tunnel further comprises:
comparing the user identifier to entries in the list of interception identifiers.

14. The method of claim 1, where receiving, at the tunnel request engine of the firewall, the GTP tunnel request from the first GTP tunnel endpoint further comprises:
monitoring inline GTP packets.

15. The method of claim 1, where receiving, at a tunnel request engine of the firewall, the GTP tunnel request from the first GTP tunnel endpoint further comprises:
offline tapping of GTP tunnel requests and GTP tunnel packets, where the GTP tunnel request is one of the GTP tunnel requests received based on the offline tapping.

16. A GPRS Tunneling Protocol (GTP) module, comprising:
a tunnel request engine operable to process received GTP tunnel requests; and
a tunnel packet engine operable to process received GTP tunnel packets associated with a GTP tunnel created based on one of the GTP tunnel requests,
where the tunnel request engine includes a list of interception identifiers to determine if the GTP tunnel packets should be intercepted and generates a list of GTP tunnel identifiers recognized for interception based on the received GTP tunnel requests, and
where the tunnel packet engine identifies GTP tunnel packets to intercept based on the list of GTP tunnel identifiers and, when the list of interception identifiers has been updated to include a new entry after the GTP tunnel over which the GTP tunnel packets that are to be intercepted has been created, compares a user identifier in a header of one of the GTP tunnel packets with the list of interception identifiers to identify the one of the GTP tunnel packets to intercept.

17. The GTP module of claim 16, where the list of interception identifiers is updated in substantially real-time with respect to receipt, by the GTP module, of the received GTP tunnel requests.

18. The GTP module of claim 16, where an entry in the list of interception identifiers includes one or more of an International Mobile Subscriber Identity number, a Mobile Station Integrated Services Digital Network number, an Internet Protocol (IP) address, a GTP tunnel endpoint identifier, a Routing Area Identity number, an Access Point Name, a Charging ID number, or a Charging Gateway Address.

19. The GTP module of claim 16, where the tunnel packet engine is operable to intercept GTP tunnel packets based on the list of GTP tunnel identifiers received from the tunnel request engine.

20. The GTP module of claim 16, where the tunnel packet engine is to further one or more of
log the GTP tunnel packets,
record the GTP tunnel packets, or
forward the GTP tunnel packets.

21. The GTP module of claim 16, where the GTP module is positioned inline between a Gateway GPRS Support Node and a Serving GPRS Support Node.

22. The GTP module of claim 16, where the GTP module is positioned offline.

23. The GTP module of claim 16, further comprising:
a memory operable to store data from an intercepted GTP tunnel packet.

24. The GTP module of claim 16, further comprising a tap coupling an offline GTP module to GTP tunnel requests and GTP tunnel packets.

25. The GTP module of claim 16, where the tunnel packet engine is operable to process GTP tunnel packets from a plurality of GTP tunnels.

26. A method for intercepting GPRS tunneling protocol (GTP) packets, the method comprising:
receiving, at a tunnel request engine of a firewall, a GTP tunnel request from a GTP tunnel endpoint;
identifying, by the tunnel request engine, a user identifier associated with the GTP tunnel request;
comparing, by the tunnel request engine, the user identifier with a list of interception identifiers;
adding, by the tunnel request engine and when the user identifier matches an interception identifier in the list of interception identifiers, a tunnel identifier for a GTP tunnel, associated with the GTP tunnel request, to a list of GTP tunnel identifiers recognized for interception;
receiving, at a tunnel packet engine, of the firewall, that is different than the tunnel request engine, GTP tunnel packets associated with the GTP tunnel, each of the GTP tunnel packets including tunnel identification information;
intercepting, by the tunnel packet engine, the GTP tunnel packets when the tunnel identification information matches one of the GTP tunnel identifiers;
allowing, by the tunnel packet engine, the GTP tunnel packets to pass through the firewall when the tunnel identification information does not match one of the GTP tunnel identifiers;
determining, by the tunnel packet engine and after the allowing, that the list of interception identifiers has been updated to include a new interception identifier entry;
intercepting, by the tunnel packet engine and after the determining, one of the GTP tunnel packets when a user identifier of the one of the GTP tunnel packets matches one of the interception identifier in the updated list of interception identifiers;
associating the one of the GTP tunnel packets, that was intercepted, with a tunnel identifier; and intercepting, by the tunnel packet engine, a subsequent one of the GTP tunnel packets based on the tunnel identifier of the one of the GTP tunnel packets.

27. The method of claim 26, further comprising:

intercepting, by the tunnel packet engine, GTP tunnel packets from a plurality of GTP tunnels simultaneously.

28. The method of claim 26, further comprising:

processing, by the tunnel packet engine, each of the intercepted GTP tunnel packets.

29. The method of claim 26, where receiving, at the tunnel request engine of the firewall, the GTP tunnel request from the GTP tunnel endpoint further comprises:

monitoring inline GTP packets.

30. The method of claim 26, where receiving, at a tunnel request engine of the firewall, the GTP tunnel request from the GTP tunnel endpoint further comprises:

offline tapping of GTP tunnel requests and GTP tunnel packets.

* * * * *